J. FRAME.
INDICATOR.
APPLICATION FILED FEB. 27, 1914.

1,123,269.

Patented Jan. 5, 1915.

WITNESSES

INVENTOR
John Frame
BY
ATTORNEYS

UNITED STATES PATENT OFFICE.

JOHN FRAME, OF SEARSPORT, MAINE.

INDICATOR.

1,123,369.  Specification of Letters Patent.  Patented Jan. 5, 1915.

Application filed February 27, 1914. Serial No. 821,487.

*To all whom it may concern:*

Be it known that I, JOHN FRAME, a citizen of the United States, and a resident of Searsport, in the county of Waldo and State of Maine, have invented a new and Improved Indicator, of which the following is a full, clear, and exact description.

This invention relates to improvements in indicators, and particularly to indicators for vessels, and has for an object to provide an improved structure which will automatically and correctly indicate the amount of "pitching" of a vessel or the amount of "tossing" of a vessel.

Another object of the invention is to provide an indicator with a swinging pendulum and co-acting dials adapted to be adjusted and moved for indicating correctly the movement of the ship in either direction.

In carrying out the objects of the invention a suitable support is provided of any kind on which the indicator is mounted. For causing the indicator to show the amount of tossing of the ship the indicator is mounted so that the pendulum thereof will swing transversely to the ship but when it is desired to indicate the pitching of the ship the indicator is arranged so that the pendulum will swing fore and aft. The pendulum is provided with a finger or pointer which is adapted to move over a scale adjustably clamped to a supporting plate. The supporting plate is provided with gear teeth adjacent the dial designed to co-act with a pinion mounted on a shaft carried by a vernier scale structure co-acting with the first mentioned scale.

Figure 1:
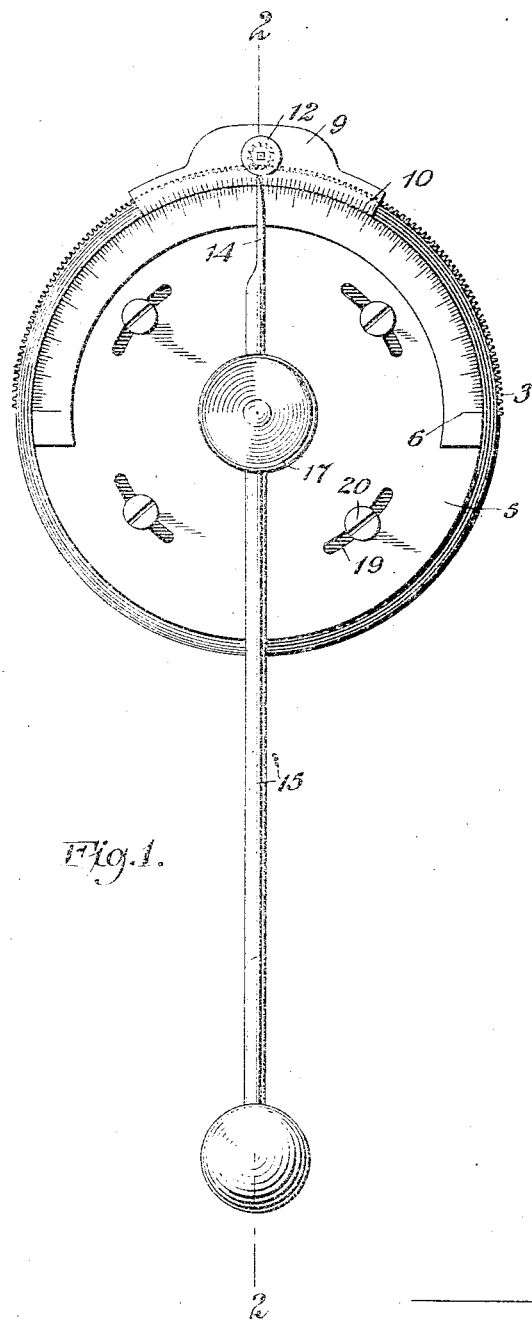
Figure 2:
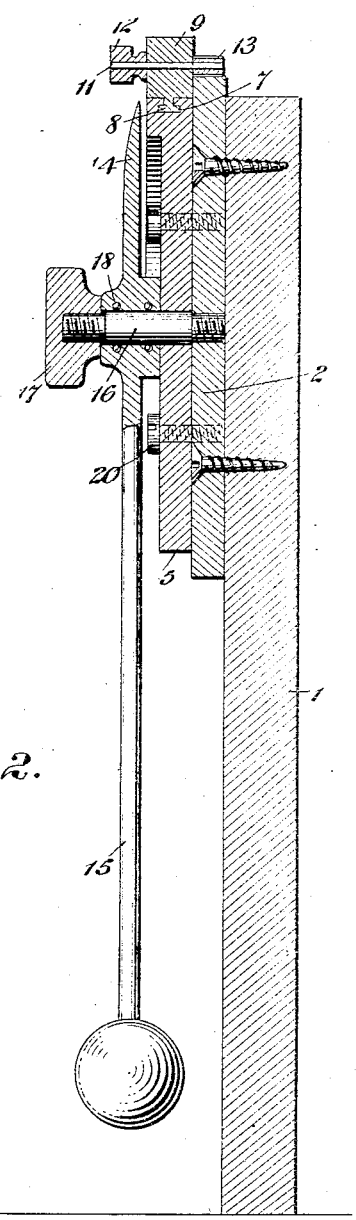

In the accompanying drawings—Figure 1 is a front view of a scale embodying the invention; Fig. 2 is a section through Fig. 1 on line 2—2.

Referring to the accompanying drawings by numeral, 1 indicates a support of any desired kind to which is secured a plate 2 having a rack 3 arranged on the upper part thereof. The plate 2 may be secured to the support 1 in any desired manner, as for instance by screws. Mounted on plate 2 is a dial plate 5 on which is arranged a scale 6 which may be graduated to any desired extent. The dial plate 5 is provided with a groove 7 in which a beaded or dovetailed member 8 is arranged, which dovetailed member is formed integral therewith or rigidly secured to a movable scale, member 9 having a vernier scale 10 arranged thereon co-acting with the scale 6 so as to show finer graduations in the usual way of scales of this character. The member 9 carries a shaft 11 to which is rigidly secured a hand or rated knob 12 and a pinion 13. The pinion 13 meshes with rack 3 so that when the pinion is rotated member 9 will be moved to the desired extent in order that the proper indications may be made in connection with scale 6. Co-acting with the scales 6 and 10 is a finger or pointer 14, which pointer extends from a pendulum 15. The pendulum 15 is rotatably mounted upon a shaft 16 threaded into or rigidly secured in any desired manner to the plate 2. A suitable nut 17 holds the pendulum 15 in place and said pendulum 15 may be provided with any desired anti-friction members 18 for causing the same to act more freely. In order to properly adjust the dial plate 5 in respect to the pendulum 15 the dial plate 5 is provided with a plurality of arc-shaped slots 19 through which extend clamping screws 20, whereby the dial plate may be clamped in any desired adjusted position.

In operation, after the device has been mounted upon a ship, the pendulum is allowed to freely swing as the vessel is tossed or as the vessel pitches. The amount of movement of the finger 14 over the scales 6 and 10 will indicate the degrees of turning or tossing of the vessel. If it is desired to accurately record the movement of the vessel at any time the thumb nut 17 may be tightened against the pendulum 15 when the same has been swung to its extreme movement and thereby lock finger 14 in place. This will allow the scales 6 and 10 to be read at leisure and an accurate record to be kept of the movement of the finger 14. For instance, a record may be made every hour or every five minutes, or any other specified time, as desired, according to the various conditions under which the ship is operating.

What I claim is—

1. In a ship indicator of the class described, a dial plate, a pendulum mounted on said dial plate and formed with a pointer, a scale arranged on said dial plate designed to co-act with said pointer, a vernier scale arranged adjacent said first mentioned scale, and manually operated means for moving said vernier scale in relation to said first mentioned scale.

2. In an indicator of the class described, a pendulum having a pointer connected therewith, a scale formed with graduations co-acting with said pointer, a rack associated with said scale, a vernier scale co-acting with said first mentioned scale, a shaft mounted in said vernier scale, a pinion mounted on said shaft meshing with said rack, and a hand operated member connected with said shaft for rotating the same.

In testimony whereof I have signed my name to this specification in the presence of two subscribing witnesses.

JOHN FRAME.

Witnesses:
John N. Sullivan,
Fred. M. Perkins.